(12) United States Patent
Fischer

(10) Patent No.: US 9,439,082 B2
(45) Date of Patent: Sep. 6, 2016

(54) MOBILE DEVICE AUDIO INDICATIONS

(71) Applicant: Myine Electronics, Inc., Ferndale, MI (US)

(72) Inventor: Joel J. Fischer, Royal Oak, MI (US)

(73) Assignee: Myine Electronics, Inc., Ferndale, MI (US)

(*) Notice: Subject to any disclaimer, the term of this patent is extended or adjusted under 35 U.S.C. 154(b) by 84 days.

(21) Appl. No.: 14/290,261

(22) Filed: May 29, 2014

(65) Prior Publication Data

US 2015/0350416 A1 Dec. 3, 2015

(51) Int. Cl.
| | |
|---|---|
| *H04W 24/02* | (2009.01) |
| *H04M 3/02* | (2006.01) |
| *H04M 3/28* | (2006.01) |
| *H04M 3/22* | (2006.01) |
| *H04B 1/3822* | (2015.01) |
| *H04B 1/3827* | (2015.01) |

(52) U.S. Cl.
CPC ............ *H04W 24/02* (2013.01); *H04B 1/3822* (2013.01); *H04B 1/3833* (2013.01); *H04M 3/02* (2013.01); *H04M 3/22* (2013.01); *H04M 3/28* (2013.01)

(58) Field of Classification Search
CPC ...... H04B 1/3822; H04B 15/00; H04B 3/06; H04W 4/008; H04W 68/00; H04W 88/04; H04W 24/00; H04W 24/02; H04M 3/22; H04M 3/2209; H04M 3/02
USPC .......... 455/557, 559, 567, 568.1, 569.2, 570
See application file for complete search history.

(56) References Cited

U.S. PATENT DOCUMENTS

| | | | |
|---|---|---|---|
| 2006/0168627 A1* | 7/2006 | Zeinstra | H04M 1/6091 725/75 |
| 2008/0112575 A1 | 5/2008 | Isobe | |
| 2011/0087964 A1 | 4/2011 | Patterson et al. | |
| 2012/0311473 A1 | 12/2012 | Nolterieke et al. | |
| 2014/0228078 A1* | 8/2014 | Weber | H04M 1/6091 455/569.2 |
| 2015/0127215 A1* | 5/2015 | Chatterjee | H04W 4/001 701/36 |

\* cited by examiner

*Primary Examiner* — Magdi Elhag
(74) *Attorney, Agent, or Firm* — Jennifer M. Stec; Brooks Kushman P.C.

(57) ABSTRACT

A vehicle system may be connected to a mobile device over a data connection and an audio connection, and configured to, responsive to a vehicle volume change, request over the data connection that the mobile device provide an audio indication at device volume over the audio connection, and reproduce the audio indication by the vehicle system, at vehicle volume, to indicate a loudness for audio played back from the mobile device. The mobile device may be connected to the vehicle system over the data connection and the audio connection, and configured to receive the request over the data connection that the mobile device provide the audio indication over the audio connection, and provide the audio indication at device volume to allow the vehicle system to reproduce the audio indication at the overall volume of sound played back from the mobile device through the vehicle system.

23 Claims, 3 Drawing Sheets

MOBILE DEVICE AUDIO INDICATIONS

TECHNICAL FIELD

This disclosure generally relates to providing audio indications by a device having a volume level to a system having another volume level, to inform a user of the overall loudness of audio content played through the system.

BACKGROUND

A vehicle computing system (VCS) may be configured to play music or other audio from various sources. These sources may include, for example, radio, compact disks, and streaming audio received over the Internet. In some cases, the VCS may include an audio input through which an external device may play audio back through the VCS. The external device and the VCS may each include a volume setting to allow a user to adjust the volume of the audio.

SUMMARY

In a first illustrative embodiment, a system includes a vehicle system, connected to a mobile device over a data connection and an audio connection, and configured to, responsive to a vehicle volume change, request over the data connection that the mobile device provide an audio indication at device volume over the audio connection, and reproduce the audio indication by the vehicle system, at vehicle volume, to indicate a loudness for audio played back from the mobile device.

In a second illustrative embodiment, a system includes a mobile device, connected to a vehicle system over a data connection and an audio connection, and configured to receive a request over the data connection to provide an audio indication over the audio connection, and provide the audio indication at device volume over the audio connection to cause the vehicle system to reproduce the audio indication at vehicle volume to indicate a loudness for audio played back from the mobile device.

In a third illustrative embodiment, a computer-implemented method for a vehicle includes, responsive to a change in vehicle volume for a vehicle system connected to a mobile device over a data connection and an audio connection, requesting over the data connection that the mobile device provide an audio indication over the audio connection; and reproducing the audio indication by the vehicle system at vehicle volume to indicate a loudness for audio played back from the mobile device through the vehicle system.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Devices, such as mobile phones or portable music players, may be connected to an audio input of a vehicle to provide audio content through the vehicle sound system. However, it may be difficult to determine ahead of time what the actual volume level will be for the audio content played through the vehicle. This is because there are two different volume levels contributing to the overall sound level that will be provided: (i) the volume level of the vehicle sound system and (ii) the volume level of the connected device. Moreover, it may also be difficult to relay to the user a new volume level that will be heard as the vehicle volume level is changed.

An improved vehicle sound system may be configured to request, over a data connection to a connected mobile device, for the mobile device to play an audio indication through an audio connection of the mobile device to the vehicle. The vehicle may accordingly receive the audio indication from the device, and may reproduce the audio indication at the vehicle volume to indicate an overall volume of sound played back from the mobile device through the vehicle system. The audio indication may be requested by the vehicle, for example, upon changing the volume of the audio system. Thus, the system may be able to relay to the user the actual volume that will be heard as the user changes the vehicle volume, by using the overall audio path from the mobile device through the vehicle systems, without complicated algorithms or calculations.

While the disclosed examples are discussed in relation to a mobile device in communication with a vehicle audio system, it should be noted that the disclosed aspects are equally applicable to other sources of audio having a volume level unknown to the audio reproducer, such as an Internet-based audio streaming service, or in environments other than vehicles, such as auditoriums or outdoor presentations.

Figure 1:
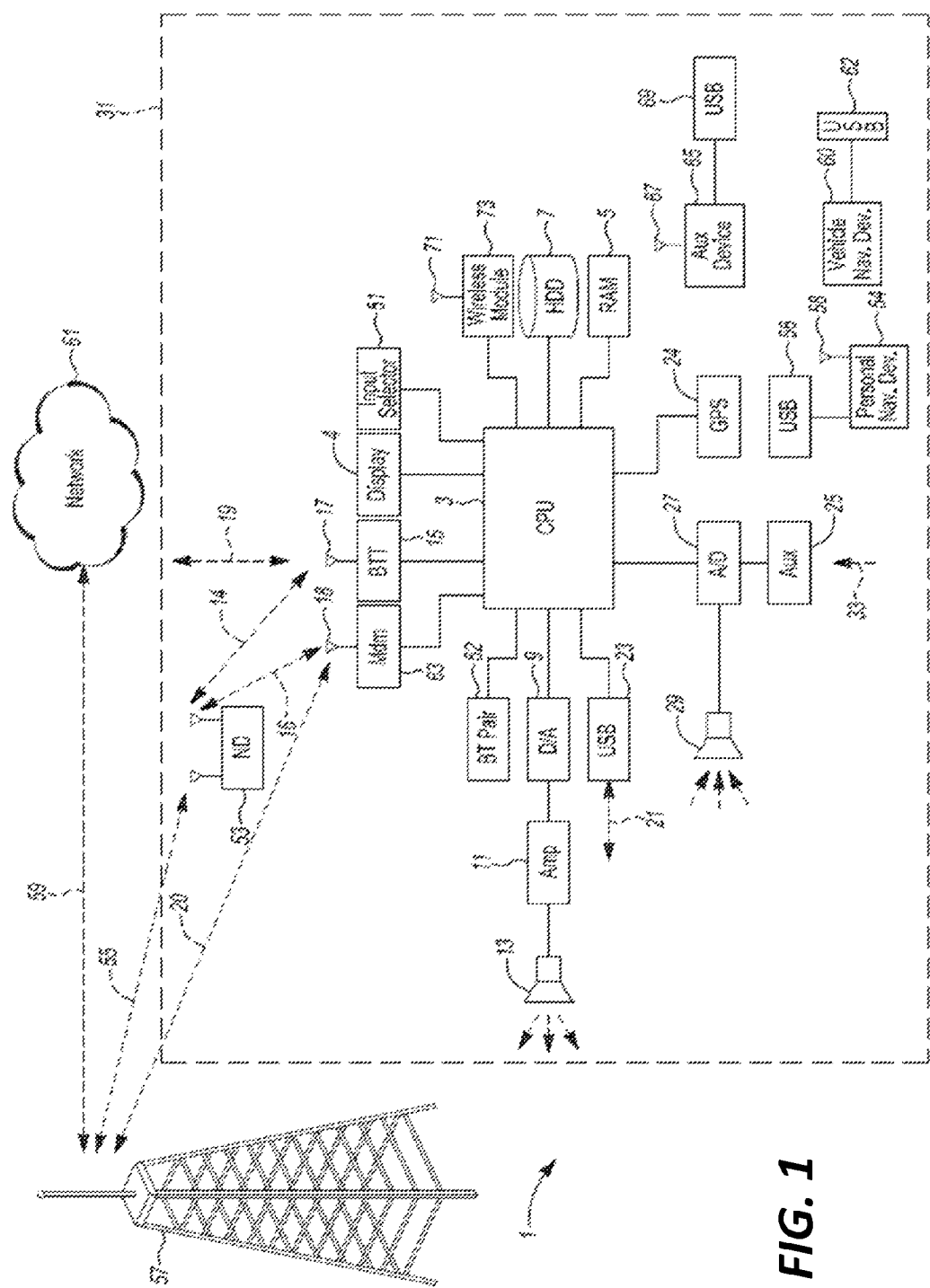
FIG. 1 is an exemplary block topology of a vehicle infotainment system implementing a user-interactive vehicle based computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
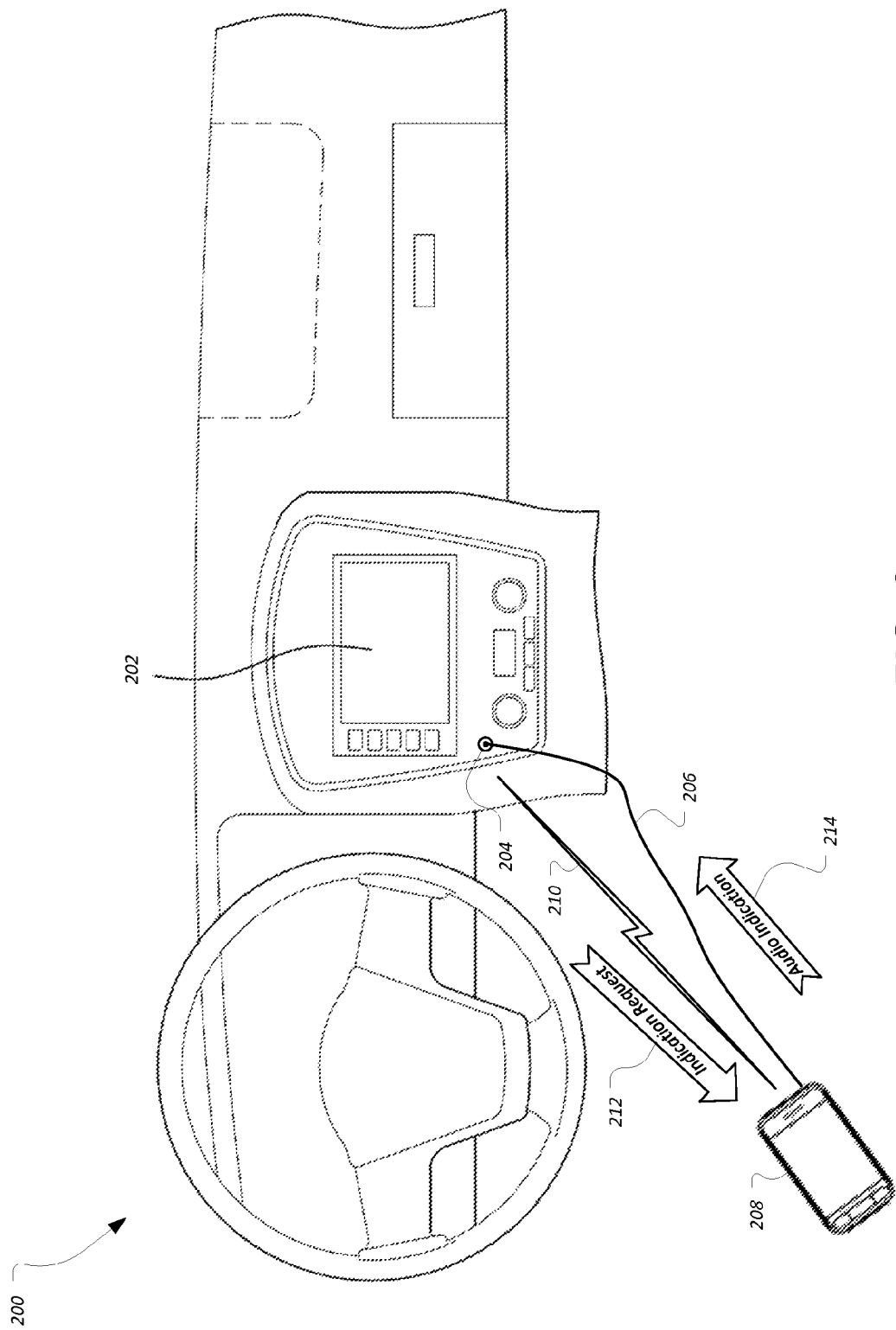
FIG. 2 illustrates an exemplary system including a vehicle configured for playing audio content from mobile devices via the vehicle infotainment system.

FIG. 2 illustrates an exemplary system 200 including a vehicle 31 configured for playing audio content from mobile devices 208 via the VCS 1. As illustrated, the vehicle 31 includes a head unit 202 of the VCS 1 configured to facilitate access to a sound system of the vehicle 31 (e.g., the speakers 13 and amplifier 11 discussed above). The system 200 also includes a mobile device 208 having an audio connection 206 to an external audio input 204 of the VCS 1 to provide audio for playback through the vehicle 31. The mobile device 208 is further connected to the VCS 1 over a data connection 210, and configured to provide audio indications 214 over the audio connection 206 responsive to indication requests 212 received over the data connection 210. It should be noted that this configuration is merely exemplary, and other vehicle 31, VCS 1, and mobile device 208 layouts may be utilized as well.

The head unit 202 of the VCS 1 may be configured to provide for user control of the vehicle sound system. For example, the head unit 202 may be configured to provide a user interface facilitating selection of an audio input to be played back through the speakers 13 of the vehicle audio system. The head unit may be further configured to provide a user interface facilitating selection of a vehicle volume level through which audio content may be provided through the vehicle audio system, e.g., to control a gain level of the amplifier 11. The head unit may be further configured to provide current status information to the user, such as an indication of the currently active audio input, and an indication of the current volume level.

The external audio input 204 may be an auxiliary or other input to the VCS 1 configured to receive audio content from a device external to the VCS 1. The external audio input 204 may include, as some non-limiting examples, a wired audio input 204 such as a ⅛" headphone jack, a ¼" headphone jack, stereo phono plugs, the audio pins of a 30 pin iPod connector, or a wireless audio input 204, such as a Bluetooth audio input. A device supplying audio to the VCS 1 may be connected to the external audio input 204 (e.g., via an audio cable between a connected device and the external audio input 204, via a wireless connection, etc.) to create an audio connection 206 between the device and the VCS 1. The audio connection 206 may accordingly be a connection from the mobile device 208 to the VCS 1 over which audio content may be provided at a device volume level. The mobile device 208 may be one example of a connected device configured to provide audio to the VCS 1 via the audio connection 206. In some cases, the audio connection 206 may be made from a variable level output of the mobile device 208 (e.g., a headphone output) to the audio input 204 of the VCS 1.

The data connection 210 may include one or more wired connections (e.g., a USB connection) and/or a wireless connections (e.g., a Bluetooth connection) between the mobile device 208 and the VCS 1. The mobile device 208 may be configured to be connected to the VCS 1 via the data connection 210. Thus, the data connection 210 may be a connection from the mobile device 208 to the VCS 1 over which non-audio data may be provided between the mobile device 208 and the VCS 1. For example, if a user brings a mobile device 208 (e.g., a nomadic device 53) that has previously been associated with the VCS 1 into the vehicle 31, then the VCS 1 may automatically pair with the detected mobile device 208. As another example, if the mobile device 208 has not been previously paired with the VCS 1, the user may utilize the head unit 202 user interface to set up the mobile device 208 to pair with the VCS 1. Once the mobile device 208 is paired with the VCS 1, the data connection 210 between the nomadic device 53 and VCS 1 may be configured to allow the VCS 1 and mobile device 208 to transfer data, such as packet-based data information, to one another.

It should be noted that, in some cases, the audio connection 206 and the data connection 210 may be both carried over the same underlying connection (e.g., over the same physical connection, over the same wireless connection, etc.). In such cases, audio content at a device volume level may be provided from the mobile device 208 to the VCS 1 and data content from the VCS 1 to the mobile device 208 may be provided over the same connection. In an example, audio content and data content may be provided digitally over the same wireless connection between the VCS 1 and the mobile device 208.

For audio inputs integrated within the vehicle 31, such as terrestrial radio, satellite radio or CD player audio, the VCS 1 may be pre-configured with equalizations and gain levels to ensure that the various inputs are provided at a relatively consistent level of volume to one another. However, for the audio connection 206, as the audio level may be adjustable by the connected mobile device 208 (e.g., the nomadic device 53), there may be significant difference in the actual volume of audio ultimately provided through the vehicle sound system to the user than the level of volume provided from another input. This may be an issue for the user when switching inputs, as the volume level may be drastically different from what the user is expecting. Moreover, this may be an issue for the user when adjusting the volume settings of the VCS 1, because although the VCS 1 may provide an indication of its own volume level (e.g., audibly after changing the vehicle volume setting or via the display 4), it may be unclear to the user how loud the audio from the mobile device 208 will be played back through the vehicle sound system.

To allow the user to hear the overall level of volume, the VCS 1 may be configured to send an indication request 212 to the mobile device 208 over the data connection 210, where the indication request 212 may be configured to cause the mobile device 208 to play the audio indication 214 over the audio connection 206 at the current mobile device 208 volume level. The audio indication 214 may be a prerecorded or generated sound utilized to indicate the overall volume level to the user. In an example, the audio indication 214 may be a beep or chime sound. The user may hear the audio indication 214 requested by and played back through the VCS 1, and may understand the overall volume level for audio being provided from the mobile device 208.

To allow the user to understand the overall volume level that may be provided upon a volume level change, the audio indication 214 may be requested by the VCS 1, for example, upon receipt of a command from the user changing the volume of the audio system. As another possibility, to inform the user of the overall volume level when switching inputs, the audio indication 214 may be requested by the VCS 1 responsive to the user switching to the audio input 204. Accordingly, the VCS 1 may be able to accurately relay to the user the actual volume that will be heard as the user changes the vehicle volume, without complicated algorithms or calculations.

Figure 3:
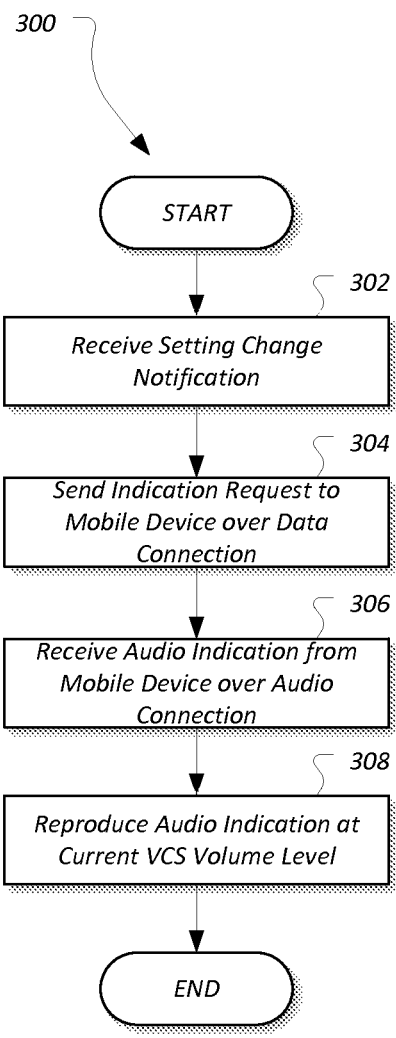
FIG. 3 illustrates an exemplary process for requesting audio indications of volume level by the vehicle infotainment system to be provided from a mobile device.

FIG. 3 illustrates an exemplary process 300 for requesting audio indications 214 of volume level by the VCS 1 to be provided from the mobile device 208. The process 300 may be performed, for example, by the VCS 1 in communication with the mobile device 208 over the audio connection 206 and the data connection 210.

At operation 302, the VCS 1 receives a setting change notification. For example, the VCS 1 may receive, from the head unit 202, an indication that the user changed the current VCS 1 volume level. As another example, the VCS 1 may receive, from the head unit 202, an indication that the user selected the external audio input 204 as the source for audio for the vehicle audio system.

At operation 304, the VCS 1 sends the indication request 212 to the mobile device 208 over the data connection 210. In some cases the indication request 212 may include a sound to be played back by the mobile device 208. In other cases, the indication request 212 may reference a sound stored by or to be generated by the mobile device 208, to be played back by the mobile device 208. In yet other cases, the indication request 212 may not specify a sound and the mobile device 208 may simply utilize a generated or stored sound that the mobile device 208 is configured to provide responsive to indication requests 212.

At operation 306, the VCS 1 receives the audio indication 214 from the mobile device 208 over the audio connection 206. The audio indication 214 may accordingly be provided as audio to the VCS 1 using the current volume level settings of the mobile device 208.

At operation 308, the VCS 1 reproduces the audio indication 214 at the current VCS volume level. For example, the VCS 1 plays back the audio indication 214 through the speakers 13 of the vehicle audio system. The user may accordingly hear the audio indication 214 requested by the VCS 1, and may understand the overall volume level for audio being provided from the mobile device 208. After operation 308, the process 300 ends.

Figure 4:
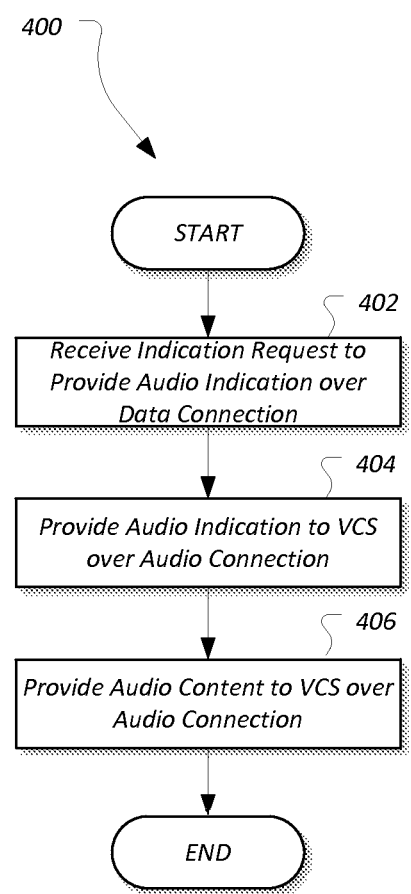
FIG. 4 illustrates an exemplary process for providing audio indications of volume level by the mobile device as requested by the vehicle infotainment system.

FIG. 4 illustrates an exemplary process 400 for providing audio indications 214 of volume level by the mobile device 208 as requested by the VCS 1. The process 400 may be performed, for example, by the mobile device 208 in communication with the VCS 1 over the audio connection 206 and the data connection 210.

At operation 402, the mobile device 208 receives the indication request 212 over the data connection 210 to provide the audio indication 214 over the audio connection 206. In some cases the indication request 212 may include a sound to be played back by the mobile device 208, while in other cases the indication request 212 may indicate for the mobile device 208 to play back a sound stored by the mobile device 208. (The stored sound may have been previously provided to the mobile device 208 from the VCS 1, e.g., in an earlier indication request 212 provided by the VCS 1 to the mobile device 208, in another message provided to the mobile device 208 before the indication request 212, etc.) In yet further cases, the indication request 212 may not specify a sound and the mobile device 208 may simply utilize a generated or stored sound that the mobile device 208 is configured to provide responsive to indication requests 212.

At operation 404, the mobile device 208 provides the audio indication 214 to the VCS 1 over the audio connection 206. The mobile device 208 may accordingly provide the audio indication 214 back to the VCS 1 at a level consistent with its volume level settings.

At operation 406, the mobile device 208 provides audio content to the VCS 1 over the audio connection 206. The user may accordingly hear the audio content at the same relative volume level of the audio indication 214 requested by the VCS 1. After operation 406, the process 400 ends.

In general, computing systems and/or devices, such as the VCS 1, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices such as the VCS 1 and mobile device 208 generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
    a vehicle sound system, connected to a mobile device over a data connection and an audio connection, configured to:
        responsive to a change in a volume level of the sound system, request over the data connection that the mobile device provide an audio indication over the audio connection at a current volume level of the mobile device, and
        reproduce the audio indication, at the volume level of the sound system, to indicate a loudness for audio played back from the mobile device.

2. The system of claim 1, wherein the vehicle sound system is further configured to reproduce audio content provided from the mobile device at the indicated loudness.

3. The system of claim 1, wherein the vehicle sound system is further configured to provide the audio indication over the data connection to be played back by the mobile device.

4. The system of claim 1, wherein the audio indication is maintained by the mobile device, and the request over the data connection includes an indication for the mobile device to play back the audio indication stored by the mobile device.

5. The system of claim 1, wherein the change in the volume level of the sound system is responsive to receipt of a command adjusting the volume level of the sound system.

6. The system of claim 1, wherein the change in the volume level of the sound system is responsive to receipt of a command changing an audio input of the sound system to play back audio from the mobile device.

7. The system of claim 1, wherein the data connection includes at least one of a universal serial bus (USB) connection between the mobile device and the vehicle sound system, and a Bluetooth connection between the mobile device and the vehicle sound system.

8. The system of claim 1, wherein the audio connection includes at least one of a wired audio connection between the mobile device and the vehicle sound system, and a wireless audio connection between the mobile device and the vehicle sound system.

9. The system of claim 1, wherein the audio indication includes one of a beep or chime.

10. A system comprising:
    a mobile device, connected to a vehicle sound system over a data connection and an audio connection, configured to:
        receive a request from the sound system over the data connection to provide an audio indication over the audio connection, and
        provide the audio indication over the audio connection, at a volume level of the mobile device, to cause the sound system to reproduce the audio indication at a volume level of the sound system to indicate a loudness for audio played back from the mobile device.

11. The system of claim 10, wherein the mobile device is further configured to provide audio content over the audio connection at the device volume to be reproduced by the vehicle sound system at the indicated loudness.

12. The system of claim 10, wherein the mobile device is further configured to receive the audio indication from the vehicle sound system over the data connection to be played back by the mobile device.

13. The system of claim 10, wherein the mobile device is further configured to maintain the audio indication to be played back.

14. The system of claim 10, wherein the data connection includes at least one of a universal serial bus (USB) connection between the mobile device and the vehicle sound system, and a Bluetooth connection between the mobile device and the vehicle sound system.

15. The system of claim 10, wherein the audio indication includes one of a beep or chime.

16. A method comprising:
    responsive to a change in a volume level of a vehicle sound system connected to a mobile device over data and audio connections, requesting, by the sound system over the data connection, the mobile device to provide an audio indication over the audio connection; and
    reproducing the audio indication by the sound system at the volume level to indicate a loudness for playing audio from the mobile device through the sound system.

17. The method of claim 16, further comprising reproducing audio content provided from the mobile device over the audio connection at the indicated loudness.

18. The method of claim 16, further comprising providing the audio indication over the data connection to be played back by the mobile device.

19. The method of claim 16, wherein the audio indication is maintained by the mobile device, and the request over the data connection includes an indication for the mobile device to play back the audio indication stored by the mobile device.

20. The method of claim 16, wherein the change in the volume level of the sound system is responsive to receipt of a command adjusting the volume level of the sound system.

21. The method of claim 16, wherein the change in the volume level of the sound system is responsive to receipt of a command changing an audio input of the sound system to play back audio from the mobile device.

22. The method of claim 16, wherein the data connection includes at least one of a universal serial bus (USB) connection between the mobile device and the vehicle sound system, and a Bluetooth connection between the mobile device and the vehicle sound system.

23. The method of claim 16, wherein the audio indication includes one of a beep or chime.

* * * * *